United States Patent
Matsubara et al.

(10) Patent No.: US 6,337,777 B1
(45) Date of Patent: Jan. 8, 2002

(54) METHOD AND APPARATUS FOR CONTROLLING DATA WRITE OPERATIONS

(75) Inventors: Nobuya Matsubara; Naoyuki Kagami; Akira Tokizono, all of Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/391,850

(22) Filed: Sep. 8, 1999

(30) Foreign Application Priority Data

Oct. 22, 1998 (JP) .......................................... 10-300812

(51) Int. Cl.[7] .............................................. G11B 5/09
(52) U.S. Cl. .............................. 360/48; 360/60; 360/53; 360/67
(58) Field of Search ............................ 360/31, 60, 53, 360/46, 67, 68, 77.02, 78.04

(56) References Cited

U.S. PATENT DOCUMENTS

| | | | |
|---|---|---|---|
| 5,107,473 A | * 4/1992 | Fuji et al. ...................... 369/32 |
| 5,650,887 A | 7/1997 | Dovek et al. | |
| 5,831,781 A | * 11/1998 | Okamura ...................... 360/75 |
| 5,909,330 A | * 6/1999 | Carlson et al. ................ 360/31 |
| 6,094,318 A | * 7/2000 | Kim ............................ 360/60 |

FOREIGN PATENT DOCUMENTS

JP          6-243617          9/1994

\* cited by examiner

Primary Examiner—Alan T. Faber
(74) Attorney, Agent, or Firm—Abdy Raissinia; Bracewell & Patterson, L.L.P.

(57) ABSTRACT

A system for preventing off track data write operations in data storage devices such as hard disk drives. In a preferred embodiment, the amplitude of a head output signal is monitored. The output signal amplitude value is determined by measuring the voltage of a capacitor used in a Variable Gain Amplifier (VGA) in an Automatic Gain Control (AGC) circuit of a hard disk drive channel unit. The measured head output signal amplitude is compared with a previously determined minimum normal head output signal amplitude reference value to determine whether the head output signal amplitude is within a normal operating range. If the measured value is less than the reference value then the head is in an off track position, and the data write operation is inhibited. Radial position dependent amplitude reference values can also be used.

12 Claims, 5 Drawing Sheets

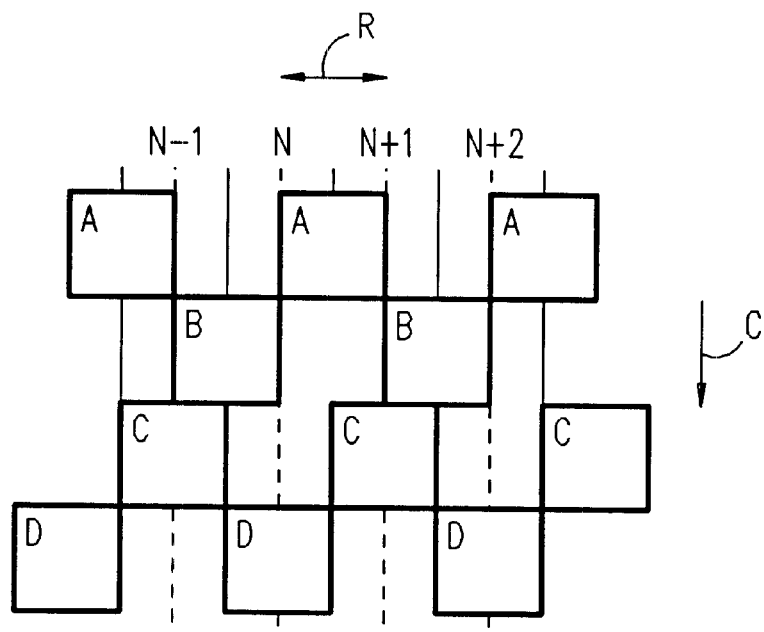
FIG. 5A
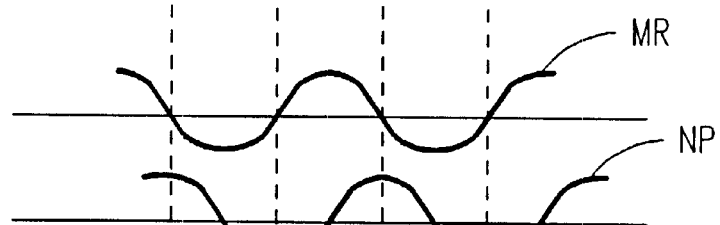
FIG. 5B
FIG. 5C
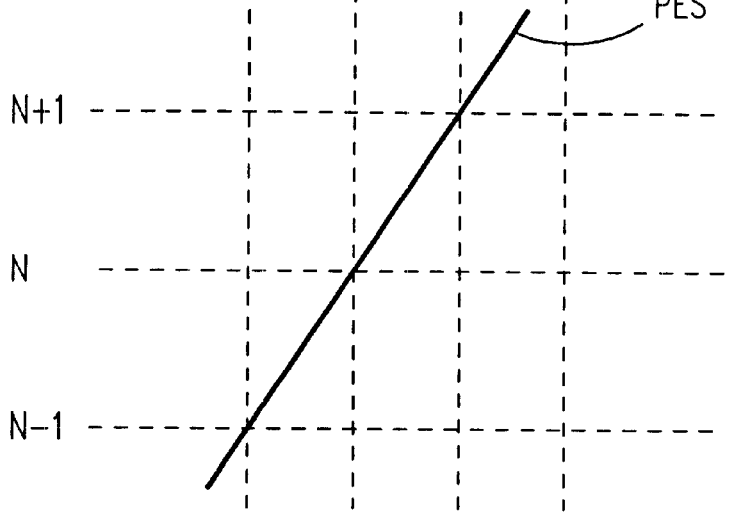
FIG. 5D

US 6,337,777 B1

METHOD AND APPARATUS FOR CONTROLLING DATA WRITE OPERATIONS

BACKGROUND OF THE INVENTION

1. Field of the Invention

The present invention relates generally to a system for controlling data write operations in data storage devices, and more particularly to a system for preventing writing data off track.

2. Description of Related Art

In disk drives a position error signal (PES) generated from head output signals is typically used by a servo to control the position of the head which in turn determines where data is written to and read from. Position error signals can be determined from the amplitude of a burst signal obtained by reading a servo pattern on the disk. As an example, the method disclosed in published Unexamined Japanese Patent Application No. 6-243617 for determining a position error signal from a burst signal is described below.

FIGS. 5A–5D illustrate a conventional method for determining a position error signal from a burst signal. Four types of servo patterns A to D are recorded at a plurality of places on a magnetic disk at constant intervals. A bidirectional arrow R shows a radial direction and the servo patterns A to D show the peripheries of data tracks N−1 to N+2. As shown in FIG. 5A, each of the servo patterns A to D comprise a square having a width almost equal to the width of a disk track. Servo track B is recorded so as to be offset by one data track width from servo track A. Similarly servo track D is offset one data track from servo track C. Servo tracks B and C are offset from each other by one half of a data track width. The servo tracks A to D are successively read by a magnetic head in the circumferential direction of a magnetic disk, that is, the direction of the arrow C.

In hard disk drives a magnetic head reads servo patterns as it is moved over the disk in a radial direction. The servo patterns A and B and the servo patterns C and D are respectively considered as pairs. Moreover, it is assumed that signals obtained when a magnetic head reads servo patterns are SA to SD. Furthermore, by computing a position error signal MP=SA−SB)/SA+SB) and a position error signal NP=(SC−SD)/(SC+SD), the position error signal MP is changed as shown by the continuous line in FIG. 5B and the position error signal NP is changed as shown by the continuous line in FIG. 5C.

The MP position error signal changes linearly when passing through the vicinity of the central portion of each concentric data track. Similarly, the NP position error signal changes linearly when passing through the vicinity of the boundary of each data track. Moreover, both the MP and NP position error signals respectively have a period in which their value is constant. This is caused by the fact that the longitudinal dimension of the read portion (gap) of a magnetic head is smaller than the width of a data track. This period is referred to as a dead zone because the position error signal cannot be used to indicate the position of a magnetic head in this period.

By switching between an MP position error signal and an NP position error signal in accordance with the position of a magnetic head on the data track and capturing only the linear portions of the signals, it is possible to generate a position error signal that is linear over a wide range of positions of the magnetic head as shown in FIG. 5D. Because the position error signal, PES, shown in FIG. 5D linearly corresponds to the position of a magnetic head on a magnetic disk, it is possible to determine the position of the magnetic head based on the position error signal.

Even if the position of a magnetic head is controlled in accordance with the above PES in a magnetic disk drive, various write instabilities may cause errors when recording data. In hard disk drives using magnetoresistive (MR) heads, write instability conditions can cause the change of a PES to be small when the head deviates from the correct track, i.e. when the head is off track. FIG. 6 shows an example in which the change of a PES is small when the head is off track, that is, the slope of position error signals MR and NP becomes small in the linear portion. In this case, even if a position error signal PES is obtained by switching between the position error signals MR and NP, there are still discontinuities. Therefore, although a magnetic head may actually be located at an off-track position, the PES may not indicate that the magnetic head is off track and the magnetic head will then write data in the off-track position. This can cause a read failure when data in the next track is attempted to be read. When this type of error occurs in a manufacturing test environment, it can cause the drive to be rejected as defective.

It is an object of the present invention to solve the above problems and provide a system for preventing data write operations when the magnetic head is off track.

SUMMARY OF THE INVENTION

The present invention provides a system for preventing off track data write operations in data storage devices such as hard disk drives. In a preferred embodiment, the amplitude of a head output signal is monitored. The output signal amplitude value is determined by measuring the voltage of a capacitor used in a Variable Gain Amplifier (VGA) in an Automatic Gain Control (AGC) circuit of a hard disk drive channel unit.

The measured head output signal amplitude is compared with a previously determined minimum normal head output signal amplitude reference value to determine whether the head output signal amplitude is within a normal operating range. If the measured value is less than the reference value then the head is in an off track position, and the data write operation is inhibited.

A further feature of a preferred embodiment of the present invention is to use radial position dependent amplitude reference values. For example, a disk can be divided into groups of one or more adjacent tracks, and a head output signal reference value can be generated for each group of tracks.

The present invention detects and prevents off-track write operations which otherwise may not be detected by position error signal (PES) based methods. In the present invention a write operation is determined to be off-track and therefore is prevented, when a head output signal amplitude is smaller than a reference value. Such an off track condition could go undetected in a conventional PES based system when the change of a PES is small due to a write instability condition. The present invention thereby improves the reliability of data write operations.

DESCRIPTION OF THE DRAWINGS

FIG. 5A illustrates a conventional servo pattern;

FIGS. 5B–5C illustrate position error signals corresponding to the servo pattern in FIG. 5A;

FIG. 5D illustrates a position error signal generated from the position error signals in FIGS. 5B–C.

DESCRIPTION OF THE PREFERRED EMBODIMENTS

Figure 1:
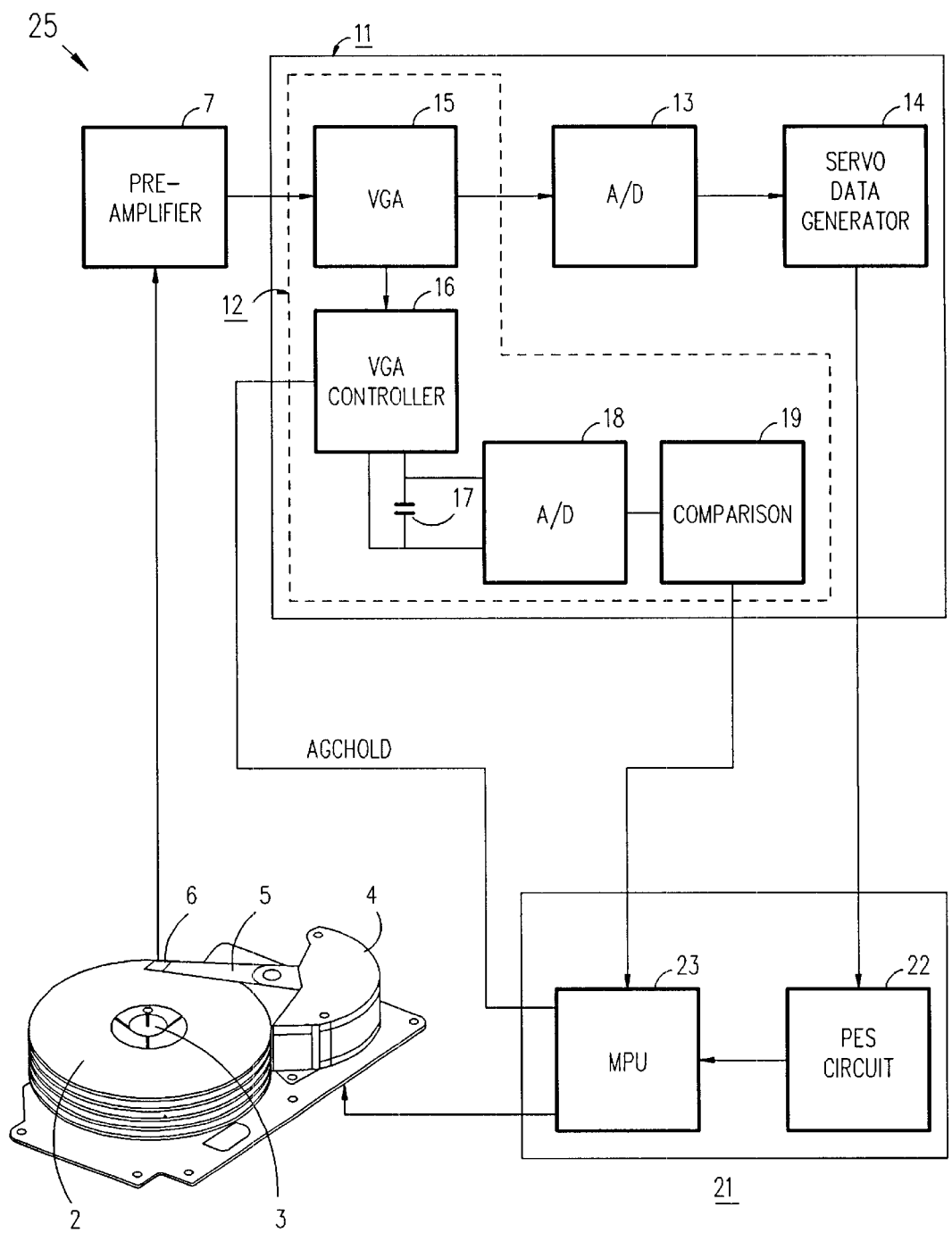
FIG. 1 is a block diagram of a data storage system for implementing a system of controlling data write operations according to the present invention.

FIG. 1 is a block diagram of a data storage system 25 for implementing a method of controlling data write operations according to the present invention. Hard disk drive data storage system 25 comprises a channel unit 11, an MPU/HDC (Micro Processing Unit/Hard Disk Control) unit 21, a disk 2, a spindle motor 3 for rotating the disk 2 at a high speed, a voice coil motor (VCM) 4, an arm 5 movable to the disk 2 connected to the VCM 4, a magnetic head 6 located at the front end of the arm 5 and set to a position facing the disk 2, and a preamplifier 7 for amplifying an output signal supplied from the magnetic head 6.

Channel unit 11 comprises an AGC (Auto Gain Control) circuit 12, an A/D converter 13 for digitizing a signal supplied from the AGC circuit 12, and a servo data generator 14 for generating servo data in accordance with a digital signal provided by A/D converter 13. The AGC circuit 12 is provided with a VGA (Variable Gain Amplifier) 15 for receiving a signal from the magnetic head 6, a VGA controller 16 for controlling the VGA 15, a capacitor 17 used for gain control connected with the VGA controller 16, an A/D converter 18 connected with the capacitor 17, and a comparison circuit 19 for comparing a signal supplied from the A/D converter 18 with a previously determined reference signal. A process of the present invention for controlling data write operations by a magnetic head is executed by AGC circuit 12.

MPU/HDC unit 21 comprises a PES circuit 22 for generating a position error signal (PES) based on a signal supplied from servo generator 14 and an MPU 23 for controlling the entire system. MPU 23 sends servo control data based on the PES to VCM 4. MPU/HDC unit 21 sends an AGCHOLD signal for turning off the AGC circuit 12 to the VGA 15. MPU/HDC unit 21 also receives a write disable signal from comparison circuit 19, which inhibits magnetic head 6 from writing data.

Figure 2:
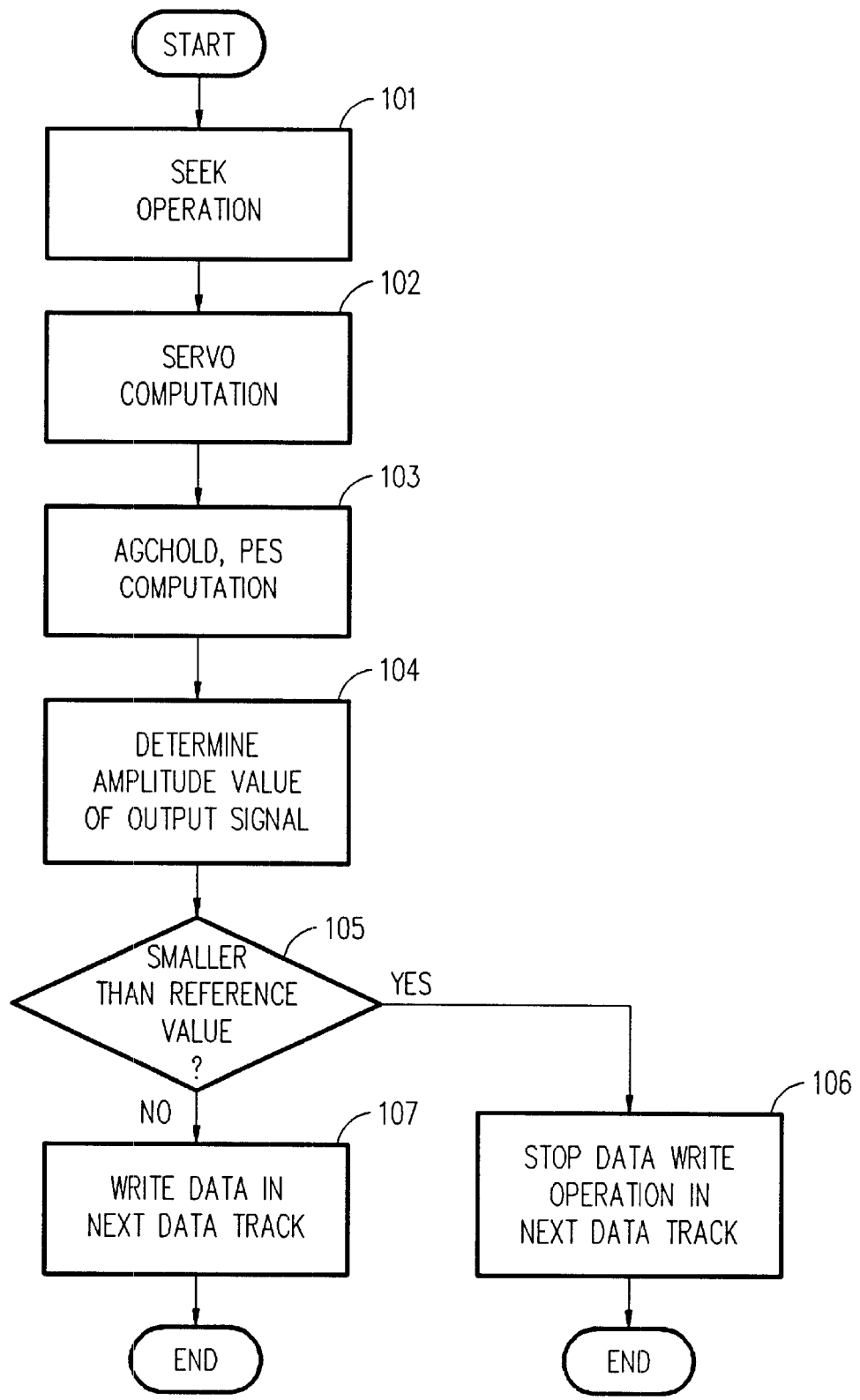
FIG. 2 is a flowchart for controlling data write operations according to one embodiment of the present invention.

FIG. 2 illustrates a flowchart for controlling data write operations according to one embodiment of the present invention. First, a seek operation is performed with magnetic head 6 (step 101). After the seek operation is complete, a servo operation moves magnetic head 6 to a correct data track using a PES (step 102). Conventional methods can be used for controlling the position of magnetic head 6 using a PES, including those described in the Background of the Invention section. Thereafter, when a region in which a servo pattern is recorded is detected, the AGC is turned off to read a PES generating burst signal from the servo pattern (step 103). The AGC is turned off using the AGCHOLD signal.

The system of the present invention monitors the magnetic head 6 output signal amplitude value in addition to the PES. First, the magnetic head 6 output signal amplitude value in a servo region is determined under an AGCHOLD state (step 104). The amplitude value is checked to determine whether it is within a normal operating range (step 105). In a preferred embodiment, the amplitude is deemed abnormal when it is smaller than a previously determined reference amplitude value. An amplitude value from a normal head can be used as the reference value. When the amplitude value is abnormal, the data write operation in a data track next to the servo pattern is stopped (step 106). When the amplitude value is not abnormal, data is written in the data track next to the servo pattern (step 107).

In the present invention, the output signal amplitude value of the magnetic head 6 is determined in a servo region, that is, under an AGCHOLD state in which the AGC circuit 12 is not operated because it is turned off and the write instability of the magnetic head 6 is detected based on the output signal amplitude value. Therefore, it is possible to monitor the state of the magnetic head 6 under an on-the-fly state while the magnetic head 6 actually writes data. As a result, it is possible to prevent insufficient amplification by the preamplifier 7 and off-track write operations caused by the change in gain of a PES.

Figure 3:
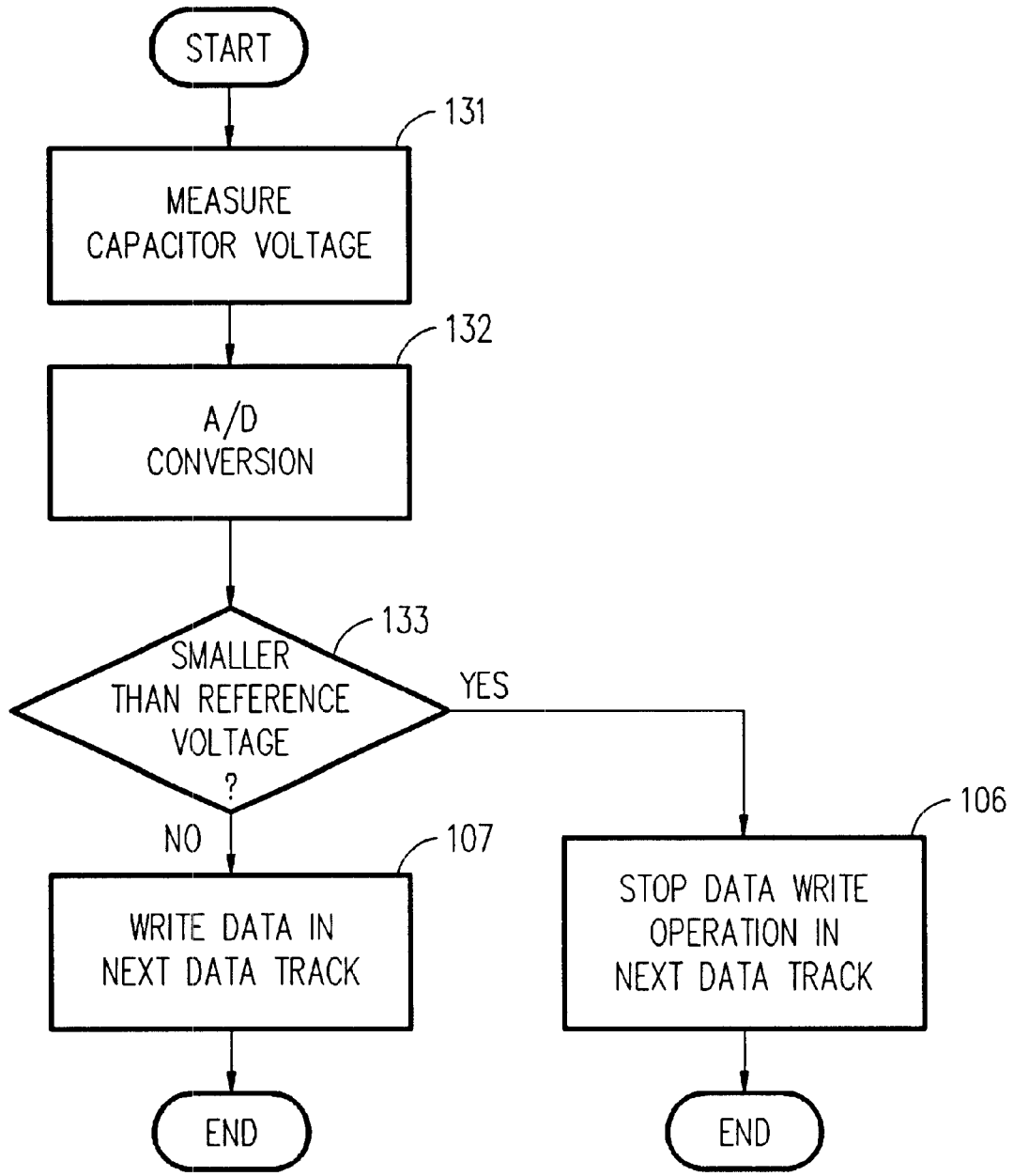
FIG. 3 is a flowchart for determining whether an amplitude value is within a normal operating range according to one embodiment of the present invention.

FIG. 3 is a flowchart for deciding whether a magnetic head 6 output signal amplitude value is abnormal. The amplitude value is evaluated for a servo region, in other words, after a seek for a data write operation is complete using the measured capacitor 17 voltage. It is assumed that a gain increases and the voltage of a capacitor corresponding to the gain lowers when an output signal amplitude value is small.

First, the voltage of the capacitor 17 is measured (step 131). The voltage on capacitor 17 is measured after the AGCHOLD signal has been asserted to turn off the AGC which renders the capacitor 17 voltage constant. Moreover, the voltage of the capacitor 17 whose gain is constant corresponds to the output signal amplitude value of the magnetic head 6. The measured capacitor 17 voltage is then digitized (step 132). Finally, the digitized voltage is compared with a capacitor 17 reference voltage corresponding to the output signal amplitude value previously determined for a normal-state head (step 133). If the measured capacitor 17 voltage is smaller than the reference voltage then the amplitude is outside of the acceptable range and the data write operation is stopped in the next track (step 106). If not then the data write operation in the next track is performed (step 107).

The reference value can be generated based on a measured value of the capacitor 17 voltage in the magnetic recording device manufacturing process. In a preferred embodiment, the reference voltage is generated by measuring a voltage on capacitor 17 during the manufacturing process and reducing the measured value as needed to account for any systematic measurement error.

Figure 4:
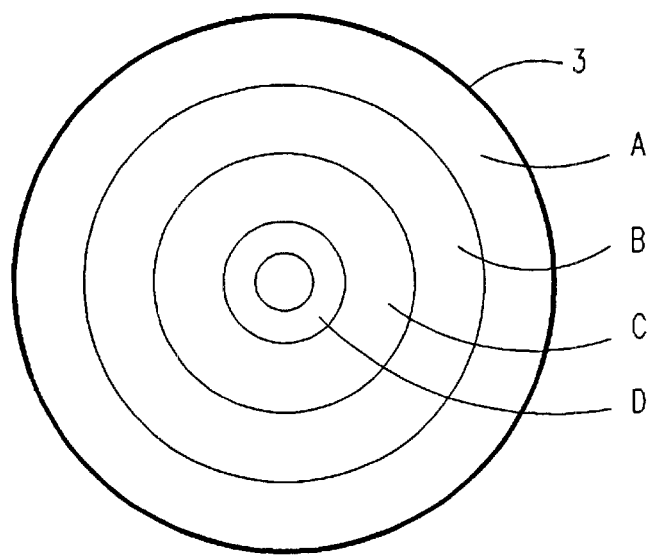
FIG. 4 illustrates a magnetic recording disk divided into a plurality of tracks.
Figure 6:
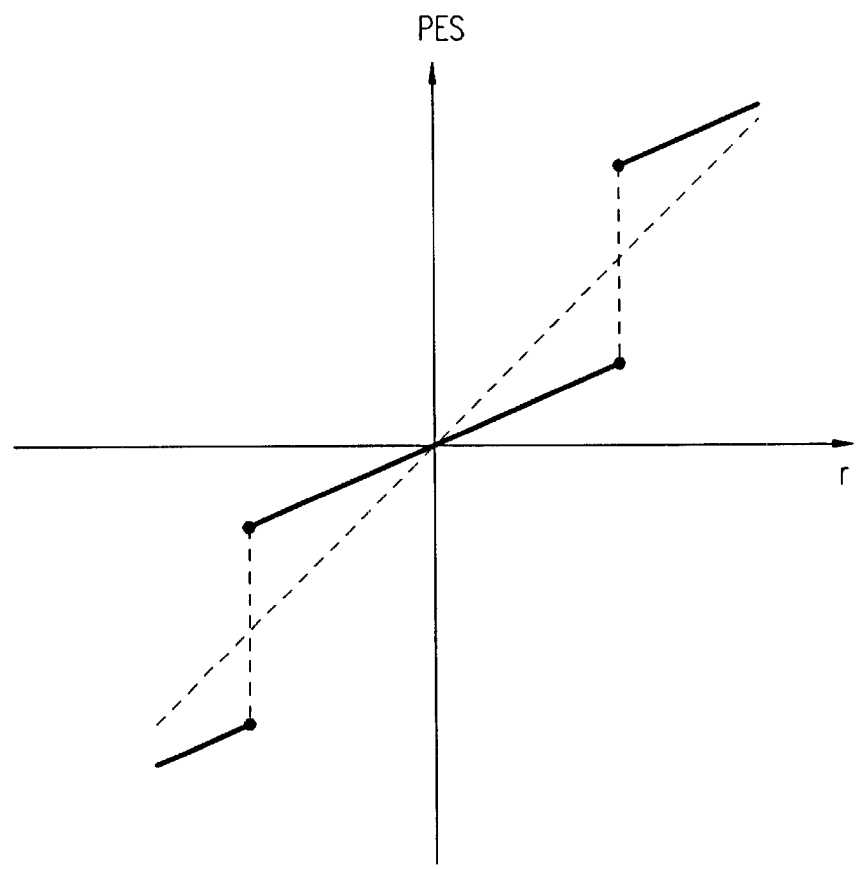
FIG. 6 illustrates a position error signal which only changes slightly when a head is off track.

In the present invention, output voltages of the magnetic head 6 change as a function of the radial position of the head on the disk 3. Therefore, in a preferred embodiment, a reference value is determined for each region in which a magnetic head is present. For example as shown in FIG. 4, disk 3 is divided into our concentric regions A to D. A reference value is determined for each region A to D. The reference value of the region in which a head is located is then used to evaluate the head output signal amplitude. In one embodiment, the reference value of a region is determined by measuring the head output signal of a known good head located at a radial distance at the midpoint of the region.

The above example describes a data write operation in a hard disk drive. However, the present invention may also be used to control data write operations with other types of heads such as optical recording heads. Moreover, the present invention can also be applied to data read operations. In data read operations, however, even if data is read at an incorrect data track, the data can be read again at a correct position. Other potential applications of the present invention method for controlling data write operations include: GMR head reset period determination procedures, PFA (Predictive Failure Analysis) procedures, and magnetic head performance evaluation procedures in a product test performed at the end of the manufacturing process, such as disclosed in U.S. Pat. No. 5,650,887.

As described above, the present invention detects and prevents off-track write operations which otherwise may not be detected by position error signal (PES) based methods. In the present invention a write operation is determined to be off-track and therefore is prevented, when a head output signal amplitude is smaller than a reference value. Such an off track condition could go undetected in a conventional PES based system when the change of a PES is small due to a write instability condition. The present invention thereby improves the reliability of data write operations.

Preferred embodiments of this invention have been described with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as RAm, etc. or by transmitting the code on a network for remote execution. The method form of the invention may be practiced by combining one or more machine readable storage devices containing the code according to the present invention with appropriate hardware to execute the code contained therein. An apparatus for practicing the invention could be one or more storage systems containing or having network access to computer program(s) coded in accordance with the invention.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for controlling data write operations in a storage device having a storage medium including at least one servo region, at least one data region, a head for writing information in said storage medium and an automatic gain control circuit for variably amplifying an output of said head, the method comprising the steps of:

temporarily turning off said automatic gain control circuit in response to entry into said servo region;

determining an amplitude of a head output signal in said servo region while said automatic gain control circuit is turned off;

comparing the measured amplitude with a predetermined reference value; and inhibiting a data write operation when the measured amplitude is less than the reference value.

2. The method for controlling data write operations of claim 1, wherein the determining an amplitude step further comprises measuring a voltage of a capacitor in said automatic gain control circuit.

3. The method for controlling data write operations of claim 1, wherein the comparing the measured amplitude step is performed after the head completes a seek operation.

4. The method for controlling data write operations of claim 1, wherein the comparing the measured amplitude step further comprises the steps of:

determining a radial position of the head; and selecting the predetermined reference value based on the head's radial position, from a plurality of predetermined reference values.

5. A data storage device comprising:

a storage medium having a servo region and a data region;

a head for writing information on said storage medium;

an automatic gain control circuit for variably amplifying an output of said head;

a controller for temporarily turning off said automatic gain control circuit in response to entry into said servo region;

a measurement circuit to determine a head output signal amplitude value in said servo region while said automatic gain control circuit is turned off;

a comparison circuit to compare the measured head output signal amplitude values to at least one predetermined reference value; and a write inhibit module to inhibit write operations when the measured head output signal amplitude value is less than the predetermined reference value.

6. The data storage device of claim 5 wherein the measurement circuit determines the head output signal amplitude by measuring a voltage of a capacitor in said automatic gain control circuit.

7. The data storage device of claim 5 wherein the write inhibit module compares the measured amplitude to the reference value after the head completes a seek operation.

8. The data storage device of claim 5 wherein the predetermined reference value is selected from a plurality of predetermined reference values based on the head's radial position.

9. An article of manufacture for use in controlling data write operations in data storage devices having a storage medium including at least one servo region, at least one data region, a head for writing information in said storage medium and an automatic gain control circuit for variably amplifying an output of said head, the article of manufacture comprising computer readable storage media including program logic embedded therein that causes control circuitry to perform the steps of:

temporarily turning off said automatic gain control circuit in response to entry into said servo region;

determining an amplitude of a head output signal in said servo region while said automatic gain control circuit is turned off;

comparing the measured amplitude with a predetermined reference value; and inhibiting a data write operation when the measured amplitude is less than the reference value.

10. The article of manufacture of claim 9, wherein the determining an amplitude step further comprises measuring a voltage of a capacitor in said automatic gain control circuit.

11. The article of manufacture of claim 9, wherein the comparing the measured amplitude step is performed after the head completes a seek operation.

12. The article of manufacture of claim 9, wherein the comparing the measured amplitude step further comprises the steps of:

determining a radial position of the head; and selecting the predetermined reference value based on the head's radial position, from a plurality of predetermined reference values.

* * * * *